E. FOX.
Distilling and Rectifying Apparatus.
No. 235,521. Patented Dec. 14, 1880.
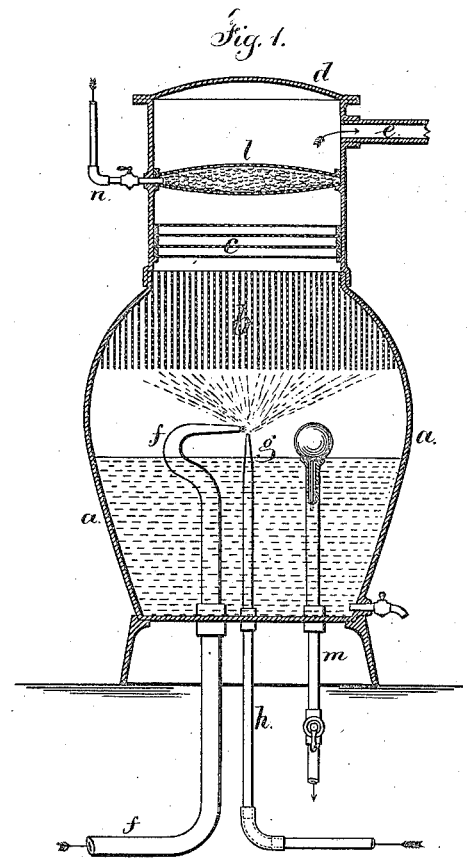
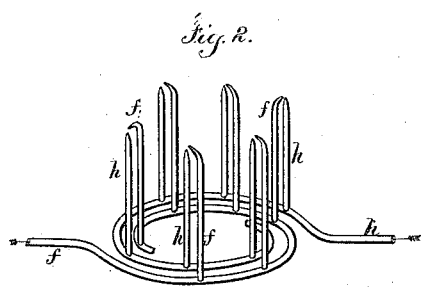

United States Patent Office.

EDWARD FOX, OF BROOKLYN, ASSIGNOR TO HIMSELF AND KIERAN EGAN, OF SAME PLACE, AND JOSEPH L. GERETY, OF NEW YORK, N. Y.

DISTILLING AND RECTIFYING APPARATUS.

SPECIFICATION forming part of Letters Patent No. 235,521, dated December 14, 1880.

Application filed December 16, 1879.

*To all whom it may concern:*

Be it known that I, EDWARD FOX, of Brooklyn, in the county of Kings and State of New York, have invented an Improvement in Distilling and Rectifying Apparatus for Wines and Spirits, of which the following is a specification.

Crude alcohol and high-wines are usually over proof, and are mixed with water before rectifying or distilling the spirits.

My invention is made for facilitating the distillation or rectification of spirits or high-wines, and relates to the heating and vaporizing of the liquid by a jet of steam, that at the same time atomizes the liquid, heating and spraying the same upon plates or wire screens. A portion of the steam condenses and the water and fusel-oil and other impurities fall back into a receptacle, from which they are removed automatically, and part of the steam and the spirit-vapors pass on through a filter for purifying or flavoring the same, if desired, and then are condensed. In cases where it is desired to age wine or spirit, a jet of air takes the place of the jet of steam, and serves to volatilize a portion of the spirit and age the liquid by bringing the air into contact with the fine particles.

In the drawings, Figure 1 is a vertical section of the rectifying apparatus, and Fig. 2 is a perspective view of the pipes and jet-tubes where several are introduced into one apparatus.

The vessel $a$ is of suitable size and shape. At $b$ there are numerous vertical, or nearly vertical, plates of metal, wire-gauze, or other suitable material, and wire screens may also be added at $c$. $d$ is the cap of the still, with a pipe, $e$, to any suitable condenser.

The liquid to be operated upon is supplied by the pipe $f$, and the upper end terminates as a nozzle adjacent to the jet-nozzle $g$ of the steam-pipe $h$. The steam admitted into the pipe $h$ issues in a jet across the end of $f$, and draws in the liquid and atomizes it as it issues from the end of $f$. This atomizing operation scatters the spirit, and the steam heats the same by mixing with it. The vapors that are thrown off pass in between the plates or screens $b$ $c$, and some of the watery portions and fusel-oils condense and run back into the vessel $a$, while the spirit-vapors and some of the steam pass on to the condenser by the pipe $e$. The heated air or steam issuing upwardly atomizes the liquid and heats it, and at the same time produces a current or circulation that aids the spirit-vapors in passing off from the watery portions, as the latter are spread upon a large extent of surface by the atomizing operation.

I prefer and use a diaphragm at $l$ for the vapors to pass through. This is composed of two or more wire screens with sponge, cotton, or wool between them, or charcoal or similar material may be used to filter the vapors and remove any remaining fusel-oil or impurities. In either case the material of the diaphragm is to be kept moist by means of high-wine spirits or other liquid supplied by the pipe and cock $n$ in the proper quantity. This diaphragm may also be employed for flavoring the liquid, according to the materials that may be supplied to the same. The fusel-oil and water of condensation run back into the vessel $a$, and there is a pipe, $m$, the upper end of which is at or near the level required for the liquid, and the fusel-oil and surplus water overflow into this tube, and there may be a valve and float to close this tube.

The warmth of the liquid in the vessel $a$ causes an evaporation of the spirit that may remain in the water, and the heat may be increased by a steam-coil in the lower part of said vessel $a$.

When this apparatus is to be made with numerous atomizers to spray and heat the spirit, it is preferable to employ a volute steam-tube and a volute supply-tube adjacent to each other, and to provide rising tubes with jet-nozzles, as indicated in the perspective view, Fig. 2, in order that the numerous pairs of tubes may act in the same manner as the tubes $f$ and $g$.

When air is introduced into this apparatus in place of steam for the purpose of aging wines or liquids the same may be heated more or less, and the air passes off through the condenser, so that any spirit it contains may be condensed, and the liquid that falls back into the vessel $a$ is drawn off into bottles or other vessels.

Wines treated in this manner are much improved in quality, as the heat or the action of the air tends to cause the deposit of germs and impurities.

I am aware that petroleum has been sprayed and vaporized by the action of steam, but there were not plates or screens to arrest the spray. These are necessary in rectifying spirits, in order that there may be an extended surface from which the spirit-vapors can pass, otherwise there is not sufficient time for the warmth to convert the spirit into vapor.

I am also aware that the vapors have been passed through filtering material. I supply into the filter liquid by means of a pipe, for the purposes before mentioned.

I do not claim the elementary devices herein referred to, as these have been separately used.

By my combination the rectifying apparatus is rendered very compact, and the steam-jet directing the atomized liquid upwardly toward and through the screens creates a current that carries the spirit-vapors upward toward the filter and condenser pipe, and the liquid portions run back in the opposite direction among the screens or plates.

I am aware that the alcohol-vapors have been passed through a vessel containing charcoal for purifying the same, as in Letters Patent No. 125,466, and also that a vessel has been used between the still and the condenser, into which flavoring materials have been introduced, as in Letters Patent No. 92,477.

In my improvement a porous absorbent diaphragm is introduced into the upper part of the still itself, and the flavoring material is supplied to the same in a liquid form through a pipe and cock.

I claim as my invention—

1. In rectifying or aging liquors, the method of securing the separation of the aqueous matter or other impurity from the liquor proper, which consists in spraying the crude spirit upward by a jet of heated fluid, to give the proper direction to the lighter vapors, and thus promote their separation by gravity, exposing the liquid in a thin film upon a large extent of surface for the spirit-vapors to separate as the liquid runs down, and conveying these separated spirit-vapors upward and to a condenser, substantially as set forth.

2. The combination, in a distilling or rectifying apparatus, of a containing-vessel, plates or screens in the upper part thereof, a supply-tube for the crude spirit, vertical jet-tubes for the heated fluid that atomizes the liquid and vaporizes the spirit, a filtering-diaphragm above the plates or screens, and a pipe to the condenser, substantially as set forth.

Signed by me this 11th day of December, A. D. 1879.

EDWARD FOX.

Witnesses:
GEO. T. PINCKNEY,
CHAS. H. SMITH.